(12) United States Patent  
Watts

(10) Patent No.: US 6,614,433 B1
(45) Date of Patent: Sep. 2, 2003

(54) METHOD AND SYSTEM FOR DISTRIBUTED, DYNAMIC GENERATION OF GRAPHICS FILES

(75) Inventor: Julian C. Watts, Thornleigh (AU)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/092,547

(22) Filed: Jun. 5, 1998

(51) Int. Cl.[7] .............................................. G06T 11/20
(52) U.S. Cl. ....................... 345/440; 345/969; 345/760; 345/733; 345/440.1; 345/440.2; 345/441; 707/100; 707/101; 707/102
(58) Field of Search ................................. 345/440, 326, 345/153, 200.1, 200.2, 200.12, 441, 589, 733, 734, 735, 760, 764, 969; 707/100, 101, 102, 2

(56) References Cited

U.S. PATENT DOCUMENTS

| | | | | | |
|---|---|---|---|---|---|
| 5,517,605 A | * | 5/1996 | Wolf | ........................... | 395/155 |
| 5,550,962 A | * | 8/1996 | Nakamura et al. | ........... | 395/133 |
| 5,715,441 A | * | 2/1998 | Atkinson et al. | ............ | 395/601 |
| 5,748,188 A | * | 5/1998 | Hu et al. | ..................... | 345/326 |
| 5,796,395 A | * | 8/1998 | de Hond | ..................... | 345/331 |
| 5,819,250 A | * | 10/1998 | Trader et al. | ................... | 707/1 |
| 5,909,223 A | * | 6/1999 | Dowdy et al. | .............. | 345/467 |
| 5,913,029 A | * | 6/1999 | Shostak | ................. | 395/200.33 |
| 6,002,853 A | * | 12/1999 | de Hond | ................. | 395/200.49 |
| 6,005,568 A | * | 12/1999 | Simmonoff et al. | ......... | 345/335 |
| 6,006,231 A | * | 12/1999 | Popa | ........................... | 707/10 |
| 6,049,342 A | * | 4/2000 | Nielsen et al. | .............. | 345/473 |
| 6,057,854 A | * | 5/2000 | Davis, Jr. et al. | ........... | 345/433 |
| 6,076,166 A | * | 6/2000 | Moshfeghi et al. | ......... | 713/201 |
| 6,098,092 A | * | 8/2000 | Padzensky | .................. | 709/203 |
| 6,286,003 B1 | * | 9/2001 | Muta | ........................... | 707/10 |
| 6,344,853 B1 | * | 2/2002 | Knight | ........................ | 345/629 |
| 6,421,429 B1 | * | 7/2002 | Merritt et al. | ........... | 379/93.17 |

* cited by examiner

*Primary Examiner*—Jeffery Brier
*Assistant Examiner*—Daniel J Chung
(74) *Attorney, Agent, or Firm*—Charles A. Johnson; Mark T. Starr; Crawford, Maunu PLLC

(57) ABSTRACT

A method and system for distributed, dynamic generation of graphics files. A database server system is configured and arranged with a service application and a graphics requester. The service application is arranged to generate a graphics file request that includes data to be graphed and a graph code indicative of a graph style. The graphics requester is coupled to the service application and arranged to provide transmission of the graphics request and receive a generated graphics file. A graphics server system is coupled to the database system and includes a graphics socket server and a graphics server application. The graphics socket server is arranged to receive graphics requests and transmit graphics files, and the graphics server application is coupled to the graphics socket server and arranged to generate a graphics file in response to the graphics request.

21 Claims, 7 Drawing Sheets

METHOD AND SYSTEM FOR DISTRIBUTED, DYNAMIC GENERATION OF GRAPHICS FILES

FIELD OF THE INVENTION

The present invention generally relates to generating graphics files, and more particularly to distributed, dynamic generation of graphics files.

BACKGROUND OF THE INVENTION

Database applications that provide the capability to generate and view various graphs that depict selected data sets are generally known. One such system is the Cool ICE software system from Unisys Corporation. Version 1.0 of Cool ICE supported a browser-type interface to a database system, where the database system had the capability to dynamically generate graphics files in response to browser requests. The graphics files generally depicted selected data sets.

A drawback to dynamically generating graphics files in such an environment is that the process is generally computationally expensive. That is, many computer machine cycles are consumed in the process of generating a graphics file. A problem with the prior approach is that computation time that was spent generating graphics files took away from computation time available for processing other data-only requests.

A method and system that addresses the aforementioned problems, as well as other related problems, are therefore desirable.

SUMMARY OF THE INVENTION

A method and system for distributed, dynamic generation of graphics files are provided in various embodiments of the invention.

In a first embodiment, a method is provided for distributed, dynamic generation of graphics files in a data processing system that includes a client system coupled to a graphics server system. The method comprises generating on the client system a graphics file request including data to be graphed and a graph code indicative of a graph style; establishing communication with the graphics server system; transmitting the request to the graphics server system; generating on the graphics server system, in response to the graphics request, a graphics file containing a representation of a graph of the style indicated by the graph code and representing the data in the request; and transmitting the graphics file from the graphics server system to the client system.

A method for processing an HTTP request from a browser is provided in another embodiment of the invention. The browser is coupled to a network server, the network server is coupled to a database server, and the database server is coupled to a graphics server, wherein the database server is arranged to provide access to a database. The method comprises: submitting an information request to the database server in response to the HTTP request; reading data from the database in response to selection information in the information request; submitting a request to the graphics server in response to the data read from the database and a graph request in the HTTP request; generating a graphics file containing a representation of a graph, the graph of a style specified in the request to the graphics server and depicting the data read from the database; transmitting the graphics file to the database server; and transmitting the graphics file to the browser.

An apparatus for distributed, dynamic generation of a graphics file in a data processing system that includes a client system coupled to a graphics server system is provided in yet another embodiment. The apparatus comprises: means for generating on the client system a graphics file request including data to be graphed and a graph code indicative of a graph style; means for establishing communication with the graphics server system; means for transmitting the request to the graphics server system; means for generating on the graphics server system, in response to the graphics request, a graphics file containing a representation of a graph of the style indicated by the graph code and representing the data in the request; and means for transmitting the graphics file from the graphics server system to the client system.

In another embodiment, a system is provided for distributed, dynamic generation of graphics files. A database server system is configured and arranged with a service application and a graphics requester. The service application is arranged to generate a graphics file request that includes data to be graphed and a graph code indicative of a graph style. The graphics requestor is coupled to the service application and arranged to provide transmission of the graphics request and receive a generated graphics file. A graphics server system is coupled to the database system and includes a graphics socket server and a graphics server application. The graphics socket server is arranged to receive graphics requests and transmit graphics files, and the graphics server application is coupled to the graphics socket server and arranged to generate a graphics file in response to the graphics request The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
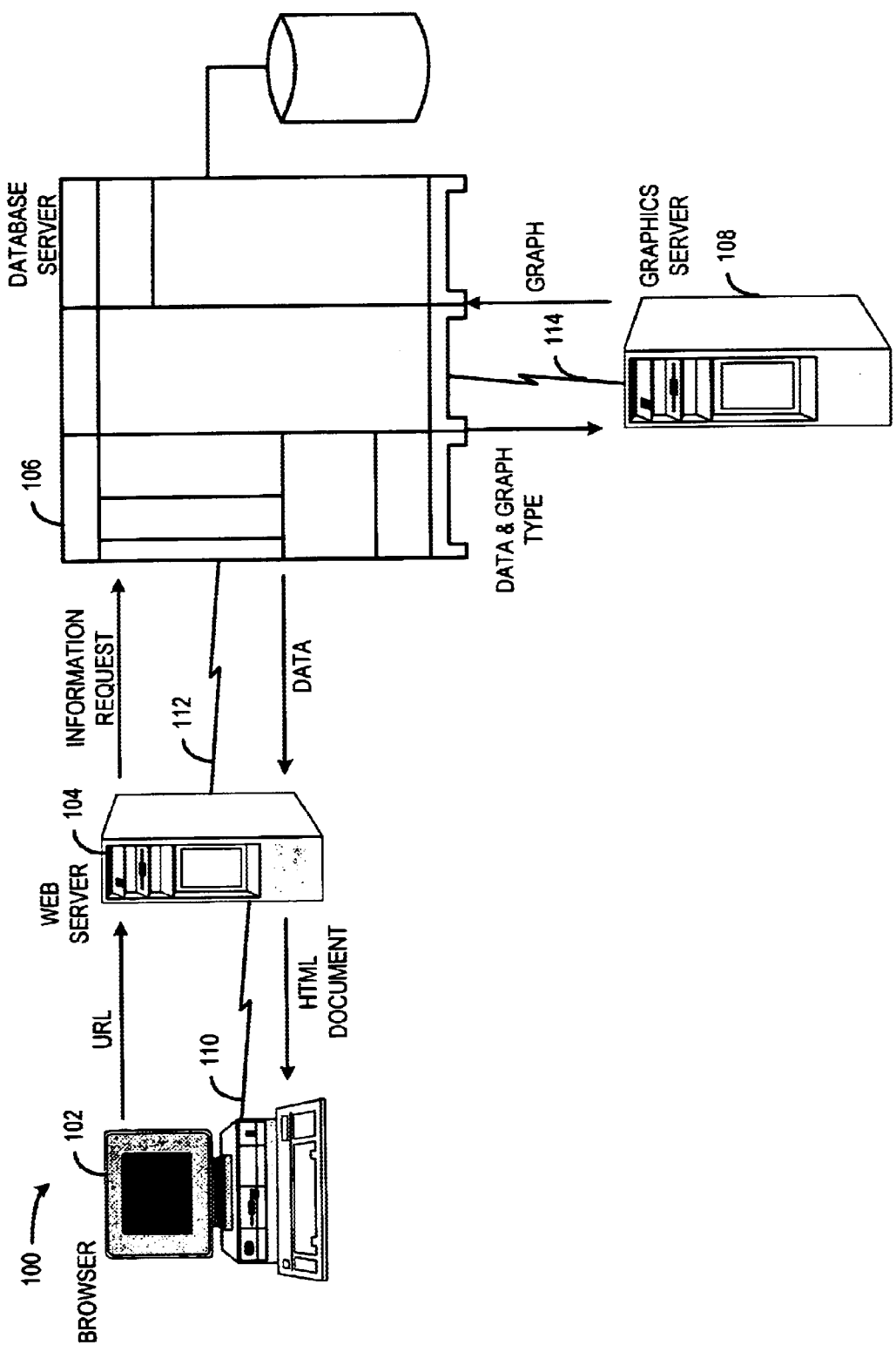
FIG. 1 illustrates an example data processing system in which the present invention can be used.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE DRAWINGS

The present invention is believed to be applicable to a variety of systems for generating graphics files. The present invention has been found to be particularly applicable and beneficial in a data processing arrangement having a database server system coupled to a graphics server system. While the present invention is not so limited, an appreciation of the present invention is presented by way of a particular example application, in this instance, in the context of an example system for dynamically generating graphics files on a graphics server system that is separate from the database server system.

FIG. 1 illustrates an example data processing system 100 in which the present invention can be used. The system 100 includes a browser system 102, a web server system 104, a database server system 106, and a graphics server system 108. The browser system 102 can be a conventional personal computer running a browser application, for example, and is coupled to web server 104 via a network 110. The web server 104 is a computer system capable of handling requests from browser system 102 as well as from other browser systems (not shown). The web server system 104 is coupled to the database server system 106 via network 112, which is not generally accessible to those not having required access privileges. A suitable class of system for database server 106 depends upon the requirements of the application program hosted by the system. A graphics server system 108 is coupled to the database server system 106 via network 114. Those skilled in the art will appreciate that networks 112 and 114 may be one and the same, depending upon user requirements.

The system 100 of FIG. 1 shows web server functionality and database server functionality as being deployed on separate data processing systems 104 and 106, for example. That is data processing systems 104 and 106 are coupled via a communication channel such as a network. Those skilled in the art will recognize that alternate embodiments are possible in which both the web server functionality and database server functionality are deployed on a single data processing system.

Figure 2:
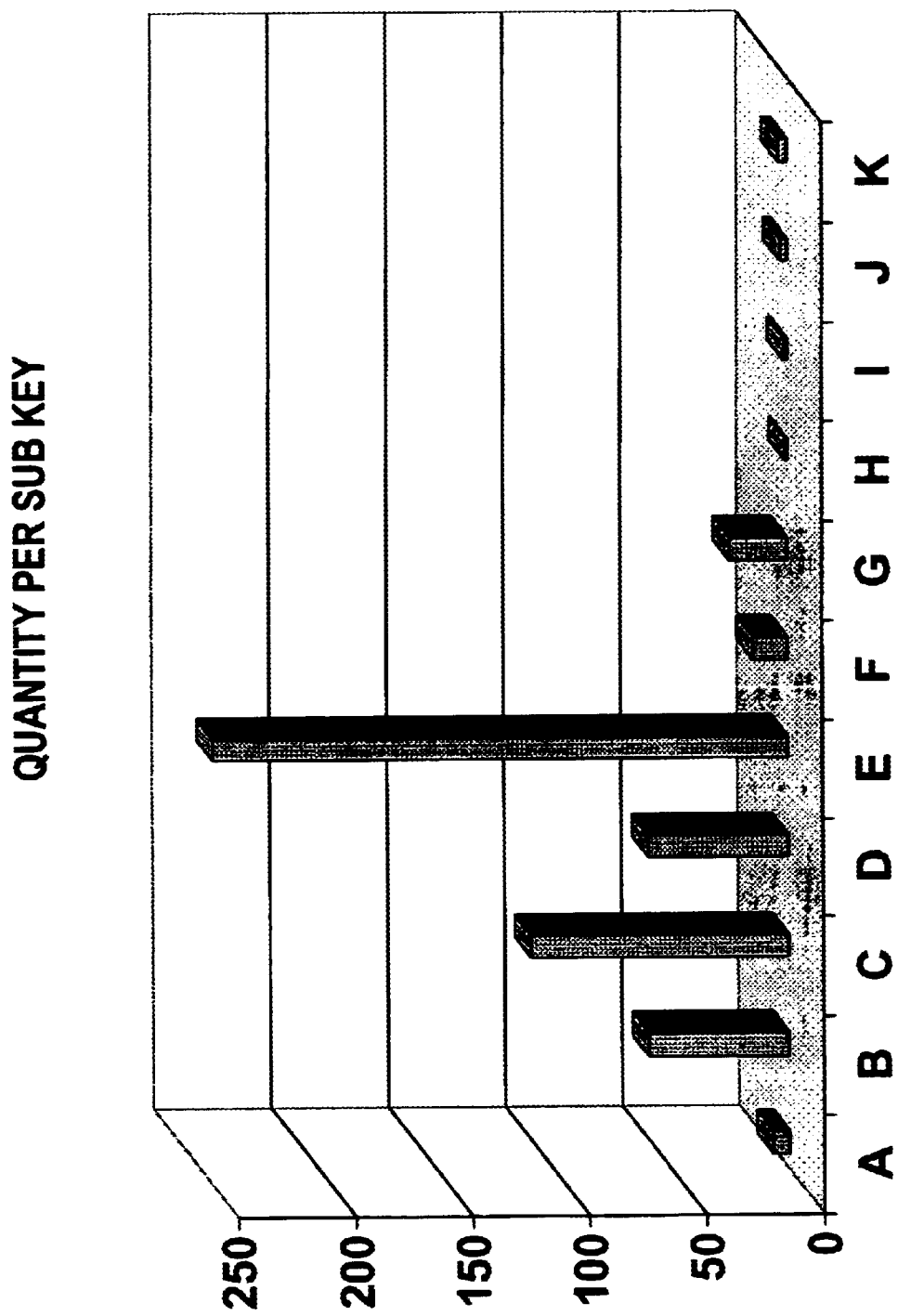
FIG. 2 illustrates an image as encoded in a graphics file generated by the graphics server system.

In the system 100 and according to an example embodiment of the invention, an example request is initiated from the browser system 102. The nature of the request depends upon the application hosted by database server 106 for which the browser system 102 provides a user interface. However, for the purposes of the present invention, an example request is for information from a database that can be presented in a graph. An example graph is illustrated in FIG. 2. The process starts, for example, with a uniform resource locator (URL) sent from the browser system 102 to the web server system 104. In response, the web server system submits an information request to the database server system 106. A database that is either internal or external to the database server 106 is then queried for the requested database server system 106 gathers the requested data, a graphics file request is prepared and sent to the graphics server system 108. The graphics file request includes the requested data and a graph code that indicates the style of graph to generate. The graphics server system 108 generates the graph based in the input data and the style of the graph and returns the graphics file to the database server 106. A link to the graphics file is provided to the web server system 104 and in turn to the browser system 102. The graphics file can then be transferred from the database server 106 to the browser system 102 by reference to the link.

The advantages are twofold for implementing the functionality of the graphics server system 108 on a computer system that is separate from the database server system 106. First, the separate graphics server off-loads processing from the database server system 106. Thus, the process of generating graphics files will be less likely to adversely impact other requests to the database server system 106 for data only (i.e., those without graphics requests). Second, multiple database server systems 106 can be coupled to a single graphics server system 108, depending upon the particular needs of various applications in such an environment. Coupling multiple database server systems to a single graphics server promotes efficient use of resources.

FIG. 2 illustrates an image as encoded in a graphics file generated by the graphics server system 108. The style of graph depicted in FIG. 2 is a bar graph. It will be appreciated that graph styles such as pie, Gannt, line and polar, area, scatter, tape, and bubble charts, as well as others can be generated. The graph style code can also specify desired attributes such as three-dimensional effects, coloring, shading, line width as well as other attributes.

Figure 3:
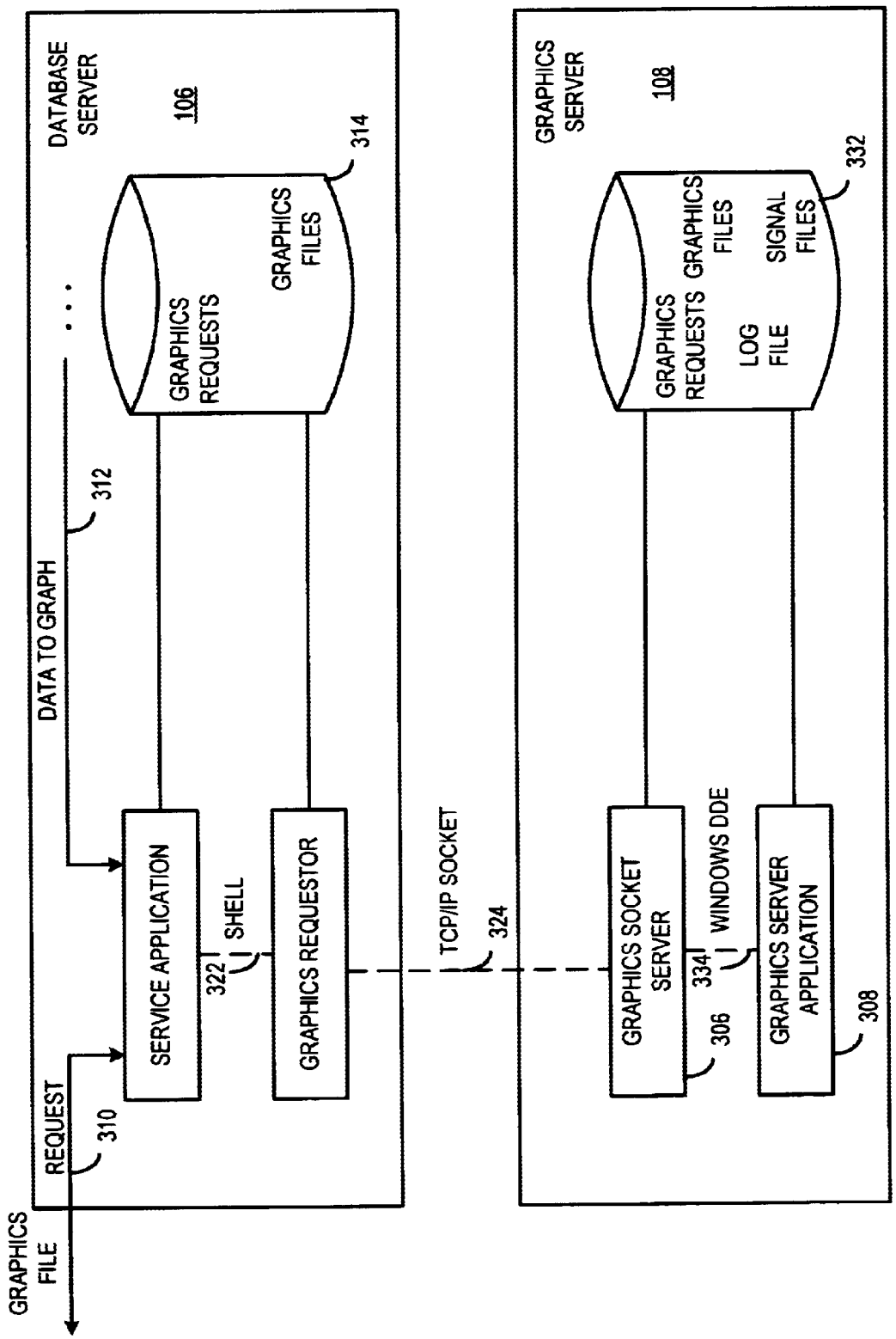
FIG. 3 is a functional block diagram of the database server system and graphics server system according to an example embodiment of the invention.

FIG. 3 is a functional block diagram of the database server system 106 and graphics server system 108 according to an example embodiment of the invention. The database server system 106 includes a service application 302 and a graphics requestor 304, and the graphics server system 108 includes a graphics socket server 306 and a graphics server application 308.

The service application 302 receives requests and data to graph as indicated by lines 310 and 312, respectively. The service application 302 generates graphics requests that are stored in storage element 314. An example graphics request is shown below:

---

DATE 25 JUL 97 13:16:32 REPORT GENERATION WEBUSER
Factors Base Report Corporate Factors Base C0004
 *Sub      Demo
 *Key      Quantity A        7
 B       60
 C      110
 D       60
 E      245
 F       15
 G       25
 H        1
 I        2
 J        3
 K        4
(Graph format codes)

---

Generally, the graph data is followed by codes that specify information such as titles, headings, labels, colors, shadings, etc.

The service application 302 initiates graphics requestor 304 via a shell command as indicated by line 322, providing requester 304 with an internet protocol (IP) address and socket identifier of the graphics socket server 306. Also provided are the name and path of the graphics request file in storage element 314 and the name and path of the output image. The graphics requestor 304 then opens a socket with the graphics socket server 306. The graphics request is sent from the graphics requestor to the graphics socket server 306 via the TCP/IP socket connection 324. The graphics requestor 304 waits for generation of the graphics file by the graphics server system 108, and upon receipt writes the file to storage element 314.

The graphics socket server 306 listens on the TCP/IP socket for graphics requests and monitors storage element 332 for completed graphics files generated by the graphics server application 308. The graphics server application 308 is initiated by the graphics socket server 306 via Windows DDE as indicated by line 334. The graphics server application 308 both periodically scans the storage element 332 for graphics requests and begins processing a graphics request in response to the DDE from the graphics socket server 306. A graphics file is generated, for example in conventional GIF format, by the graphics server application 308. The graphics file is written to the storage element 332, an entry is placed in the log file to indicate the status, and an entry is written to the signal file to indicate completion.

Figure 4:
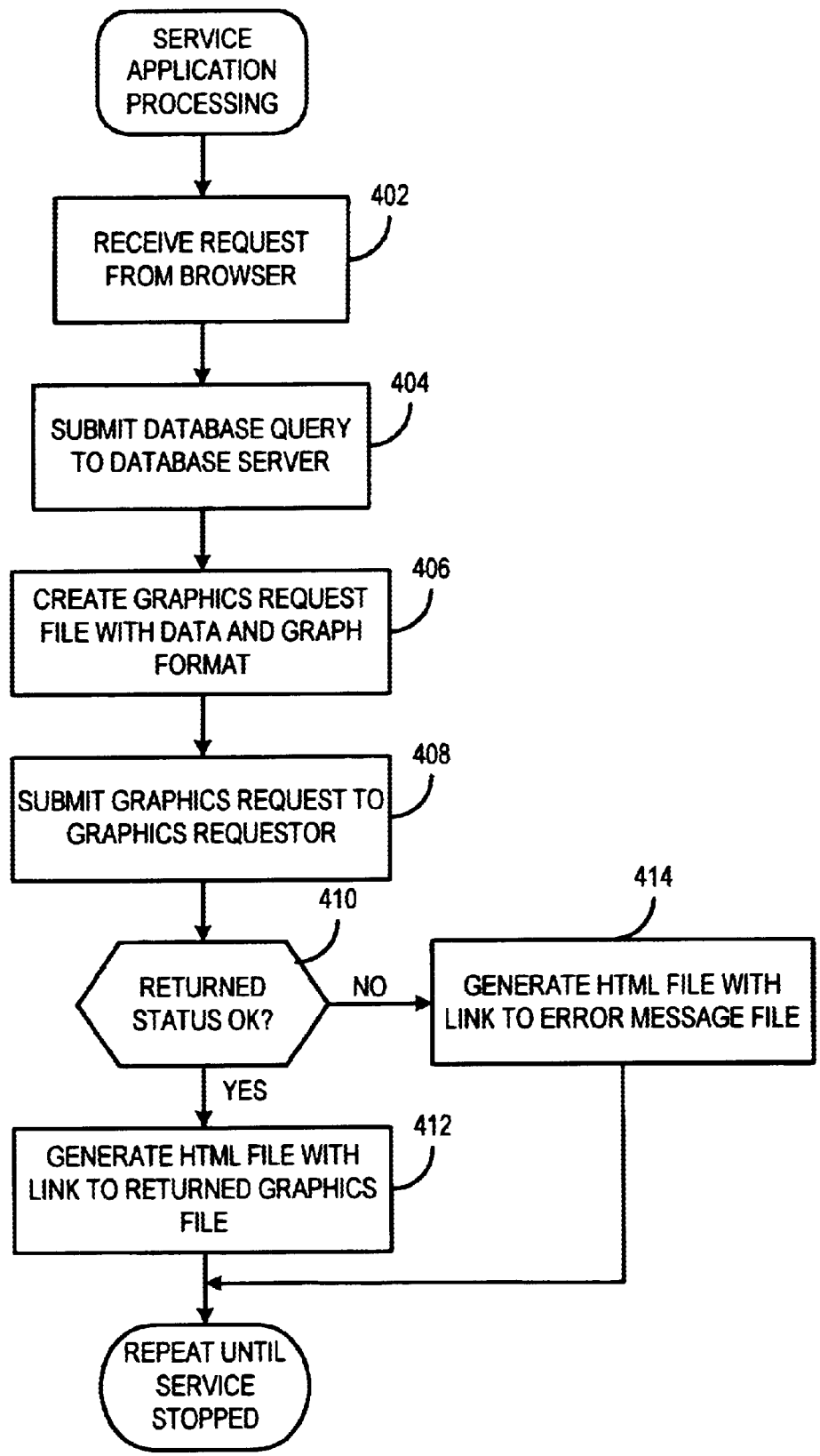
FIG. 4 is a flowchart of processing performed by the service application according to an example embodiment of the invention.

FIG. 4 is a flowchart of processing performed by the service application 302 according to an example embodiment of the invention. The service application 302 receives requests from a source, for example, a remote browser system 102. Such requests indicate information requested and a format for a graph to represent the information. The service application 302 receives such a request at block 402. In response to the request, the service application 302 submits (block 404) the appropriate request to a database system (not shown). From the data received from the database system, a graphics request is created at block 406. As explained previously, the graphics request includes the data to be graphed as well as format information to be used by the graphics server system 108 in generating the graphics file.

At block 408, the graphics request is provided to the graphics requestor 304. The request is provided by writing it to a temporary directory, which can be pre-configured, for example. The service application 302 then waits for a status to be returned from the graphics socket requestor 304. If the status returned indicates that the graphics file was successfully generated, block 410 directs control to block 412. A hyper-text markup language (HTML) file is created at block 412. The HTML file includes a link to the graphics file, which can then be requested by the browser system 102. If the status returned in generating the graphics file indicates an error, block 414 generates an HTML file that includes an error message which is returned to the browser system 102. The service application 302 repeats this processing until the service is no longer necessary.

Figure 5:
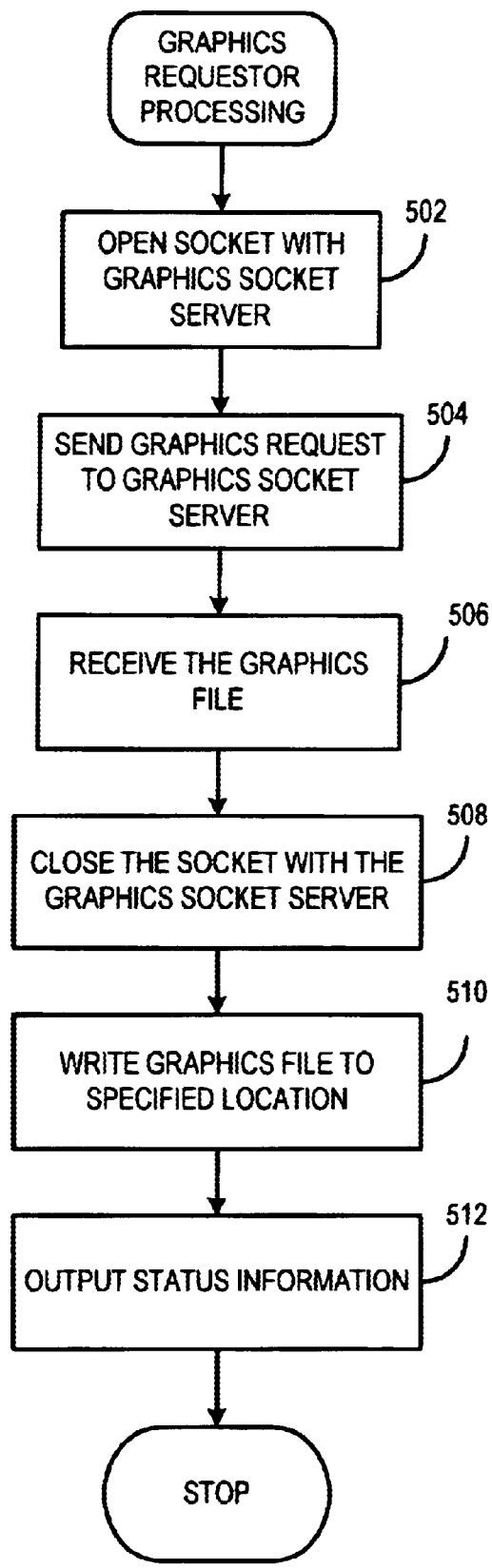
FIG. 5 is a flowchart of processing performed by the graphics requestor according to an example embodiment of the invention.

FIG. 5 is a flowchart of processing performed by the graphics requestor 304 according to an example embodiment of the invention. The graphics requester 304 provides a socket interface between the database server system 106 and the graphics server system 108. As indicated above, the graphics requestor 304 is initiated via a shell command by the service application 302 with the IP address and socket of the graphics socket server 306, the name and path of the graphics request file, and the name and path of graphics file to be generated.

At block 502, the graphics requestor 304 opens a socket with the graphics socket server 306 indicated by the service application 302. The graphics request is then sent to the graphics socket server 306 via the socket connection as shown by block 504. The graphics requester 304 then waits for a response from the graphics socket server 306.

The generated graphics file is received over the socket connection at block 506, and at block 508 the socket connection is closed. The graphics requestor 304 writes the graphics file to a directory in storage element 314 as directed by the service application 302 (block 510). Lastly, status information is output (block 512) by the graphics requester 304 to a standard output file, for example.

Figure 6:
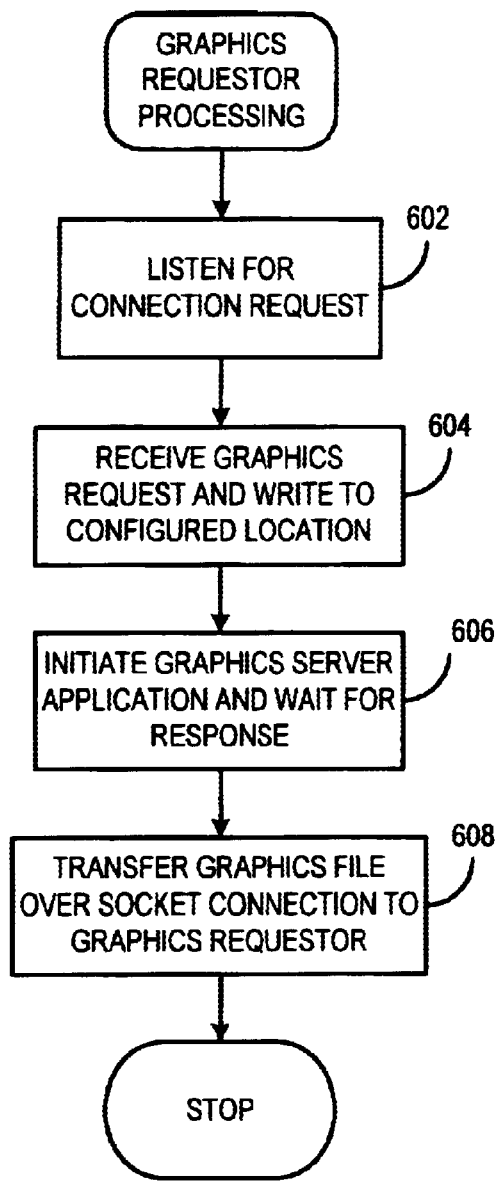
FIG. 6 is a flowchart of processing performed by the graphics socket server according to an example embodiment of the invention.

FIG. 6 is a flowchart of processing performed by the graphics socket server 306 according to an example embodiment of the invention. The graphics socket server 306, along with the graphics requester 304, provide a TCP/IP socket interface between the graphics server system 108 and the database server system 106.

The graphics socket server 306 generally monitors for two events. First the graphics socket server 306 listens on the configured socket for requests from the database server system 106 (block 602). Second, the graphics socket server 306 periodically scans the configured directory in storage element 332 for graphics files returned from the graphics server application 308. The graphics socket server 306 registers itself as a Windows DDE server, and requests that are received via DDE are to indicate that processing of a particular graphics request has been completed and that the resultant graphics file can be read.

When the graphics socket server 306 receives a graphics request, a graphics request file is created with the request (block 604). A DDE request is sent to the graphics server application 308 and the graphics socket server waits for a response at block 606.

Periodically, the graphics socket server 306 scans the configured storage element 332 for signal files being returned form the graphics server application 308. A signal file indicates when a graphics file has been fully created. If a DDE request is received from the graphics socket server 306, the directory scan is performed immediately. When a graphics file is found, the associated port is triggered. When triggered, the graphics file is read and transmitted to the graphics requestor 304 as indicated by block 608. After the file is transmitted, all the files associated with the port are deleted, a completion status code is returned via the socket, and the port is cleared.

Figure 7:
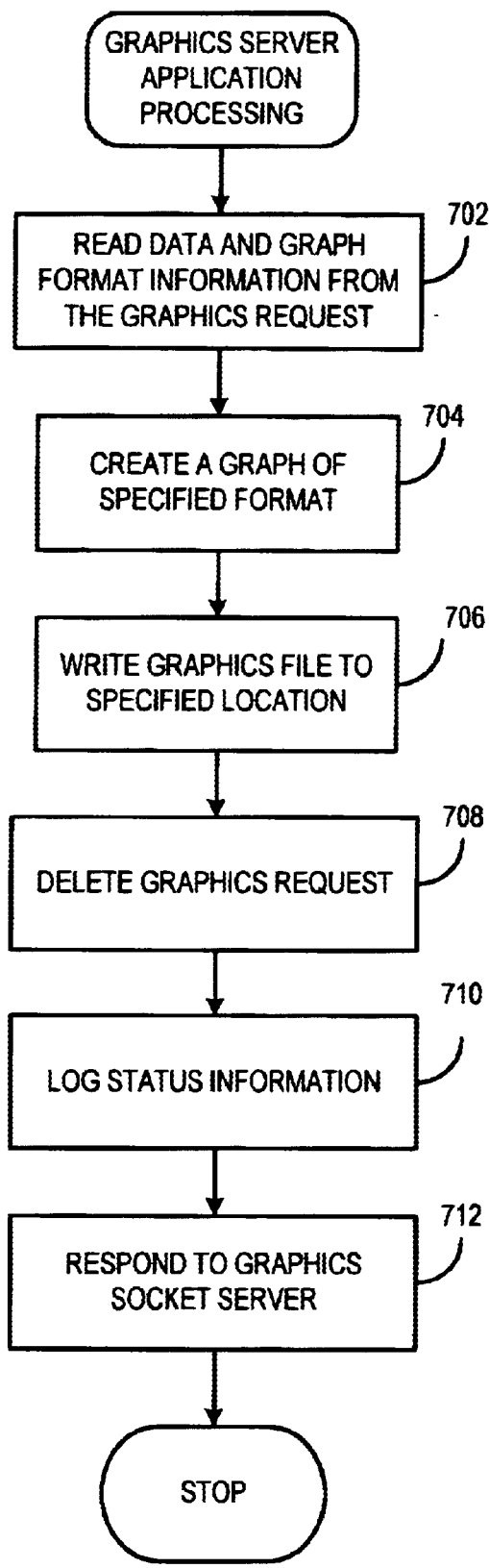
FIG. 7 is a flowchart of processing performed by the graphics server application according to an example embodiment of the invention.

FIG. 7 is a flowchart of processing performed by the graphics server application 308 according to an example embodiment of the invention. The graphics server application 308 generates graphics files in response to graphics requests received by the graphics socket server 306. Both periodically and as initiated via Windows DDE, the graphics server application scans a pre-configured directory, in storage element 332 for example, for unprocessed graphics file requests.

Upon encountering an unprocessed request, the graphics server application 308 reads the data and graph format information of the graphics request as indicated by block 702. From the graphics request, a graph of the specified format is created at block 704. An example commercially available package for creating a graph is Graphics Server software available from Pinnacle Publishing. At block 706 the graphics file is written to the location specified in the request. An example request may also include a graphic file type, such as GIF.

After the graphics file has been written, the graphics request is deleted at block 708, and an entry is placed (block 710) in the log file of the graphics server system 108. Finally, a Windows DDE request is made of the graphics socket server 306 at block 712 to indicate that the graphics file has been generated.

Accordingly, the present invention provides, among other aspects, a method and system for distributed, dynamic generation of a graphics file as between a database server system and graphics server system. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for distributed, dynamic generation of a graphics file in a data processing system that includes a client system coupled to a graphics server system, comprising:

generating on the client system a graphics file request including data to be graphed and a graph code indicative of a graph style;

establishing communication with the graphics server system;

transmitting the request to the graphics server system;

generating on the graphics server system, in response to the graphics request, a graphics file containing a representation of a graph of the style indicated by the graph code and representing the data in the request; and transmitting the graphics file from the graphics server system to the client system.

2. The method of claim 1, further comprising:

receiving the graphics request via the socket connection at the graphics server;

writing the graphics request to a selected disk storage location on the graphics server;

reading the graphics request from the selected disk storage location; and writing the graphics file at a selected location on the graphics server.

3. The method of claim 2, further comprising initiating a read of the graphics file on the graphics server system with a dynamic data exchange request.

4. The method of claim 3, further comprising periodically scanning a selected disk storage location for completed graphics files.

5. The method of claim 2, further comprising periodically scanning a selected disk storage location for completed graphics files.

6. A method for processing an HTTP request from a browser, the browser coupled to a network server, the network server coupled to a database server system, and the database server system coupled to a graphics server system, wherein the database server system is arranged to provide access to a database, comprising:

submitting an information request to the database server in response to the HTTP request;

reading data from the database in response to selection information in the information request;

generating on the database server system a graphics file request including data to be graphed and a graph code indicative of a graph style;

submitting the graphics file request to the graphics server system in response to the data read from the database and a graph request in the HTTP request;

generating a graphics file containing a representation of a graph, the graph of a style specified in the graphics file request to the graphics server system and depicting the data read from the database;

transmitting the graphics file to the database server system; and transmitting the graphics file to the browser.

7. The method of claim 6, further comprising:

establishing a socket connection between with the database server and the graphics server system;

submitting the request to the graphics server system via the socket; and transmitting the graphics file to the database server system via the socket.

8. The method of claim 7, further comprising:

generating an HTML file from the data returned from the database server system;

inserting a link to the graphics file in the HTML file; and transmitting the HTML file to the browser.

9. The method of claim 6, further comprising:

writing the request to the graphics server system to a directory; and reading from the directory the request to the graphics server system.

10. The method of claim 9, further comprising initiating a read of the directory with a dynamic data exchange.

11. The method of claim 9, further comprising:

writing an entry in a log file when generation of the graphics file is complete; and transmitting the graphics file to the network server after the entry in the log file is written.

12. The method of claim 11, further comprising initiating a read of the log using a dynamic data exchange.

13. An apparatus for distributed, dynamic generation of a graphics file in a data processing system that includes a client system coupled to a graphics server system, comprising:

means for generating on the client system a graphics file request including data to be graphed and a graph code indicative of a graph style;

means for writing the graphics request to a selected disk storage location on the client system;

means for establishing a socket connection between the client system and the graphics server system;

means for reading the graphics request from the selected disk storage location before transmission thereof to the server system;

means for transmitting the request to the graphics server system via the socket connection;

means for generating on the graphics server system, in response to the graphics request, a graphics file containing a representation of a graph of the style indicated by the graph code and representing the data in the request; and means for transmitting the graphics file from the graphic server system to the client system via the socket connection.

14. A system for distributed, dynamic generation of a graphics file, comprising:

a database server system configured and arranged with a service application and a graphics requestor, the service application arranged to generate a graphics file request including data to be graphed and a graph code indicative of a graph style and write the graphics file request to disk storage, and the graphics requester coupled to the service application and arranged to read the graphics file request from disk storage and provide for transmission of the graphics request and receive a generated graphics file;

a graphics server system coupled to the database system and including a graphics socket server and a graphics server application, the graphics socket serve arranged to receive graphics requests and transmit graphics files, and the graphics server application coupled to the graphics socket server and arranged to generate a graphics file in response to the graphics request.

15. A method for distributed, dynamic generation of a graphics file in a data processing system that includes a client system coupled to a graphics server system, comprising:

generating on the client system a graphics file request including data to be graphed and a graph code indicative of a graph style;

writing the graphics request to temporary storage on the client system;

reading the graphics request from the temporary storage before transmission thereof to the server system;

transmitting the request to the graphics server system;

generating on the graphics server system, in response to the graphics request, a graphics file containing a representation of a graph of the style indicated by the graph code and representing the data in the request; and transmitting the graphics file from the graphics server system to the client system.

16. The method of claim 15, further comprising:

establishing a socket connection between the client system and the graphics server system;

transmitting the request via the socket connection; and transmitting the graphics tile via the socket connection from the graphics server system to the client system.

17. The method of claim 16, further comprising:

receiving the graphics request via the socket connection at the graphics server;

writing the graphics request to temporary storage on the graphics server;

reading the graphics request from the temporary storage on the graphics server; and writing the graphics file to temporary storage on the graphics server.

18. The method of claim 17, further comprising initiating a read of the graphics file on the graphics server system with a dynamic data exchange request.

19. The method of claim 18, further comprising periodically scanning temporary storage on the server system for completed graphics files.

20. The method of claim 2, further comprising periodically scanning temporary storage on the server system for completed graphics files.

21. A system for distributed dynamic generation of a graphics file, comprising:

a database server system configured and arranged with a service application and a graphics requestor, the service application arranged to generate a graphics file request including data to be graphed and a graph code indicative of a graph style and write the graphics file request to temporary storage, and the graphics requester coupled to the service application and arranged to read the graphics file request from temporary storage and provide for transmission of the graphics request and receive a generated graphics file;

a graphics server system coupled to the database system and including a graphics socket server and a graphics server application, the graphics socket server arranged to receive graphics requests and transmit graphics files, and the graphics server application coupled to the graphics socket server and arranged to generate a graphics file in response to the graphics request.

* * * * *

UNITED STATES PATENT AND TRADEMARK OFFICE
CERTIFICATE OF CORRECTION

PATENT NO. : 6,614,433 B1  Page 1 of 1
DATED : September 2, 2003
INVENTOR(S) : Watts It is certified that error appears in the above-identified patent and that said Letters Patent is hereby corrected as shown below:

Column 8,
Line 63, "graphics requester" should read -- graphics requestor --.

Column 10,
Line 23, "graphics requester" should read -- graphics requestor --.

Signed and Sealed this

Sixteenth Day of December, 2003

JAMES E. ROGAN
*Director of the United States Patent and Trademark Office*